(12) United States Patent
Howard

(10) Patent No.: US 6,817,620 B1
(45) Date of Patent: Nov. 16, 2004

(54) PRECISION STEER WHEEL CONTROL SYSTEM WITH INTERNAL SOLENOID

(76) Inventor: Durrell U Howard, 199 W. Rhapsody Dr., San Antonio, TX (US) 78216

( * ) Notice: Subject to any disclaimer, the term of this patent is extended or adjusted under 35 U.S.C. 154(b) by 103 days.

(21) Appl. No.: 10/211,091

(22) Filed: Aug. 2, 2002

(51) Int. Cl.[7] ................................................. B62D 7/22
(52) U.S. Cl. ..................................... 280/89.11; 280/90
(58) Field of Search .......................... 280/89.11, 89.12, 280/89.13, 90, 268; 180/417, 421, 422, 441; 74/388 PS, 495, 496, 89.25

(56) References Cited

U.S. PATENT DOCUMENTS

| | | |
|---|---|---|
| 2,509,570 A | 5/1950 | Lee |
| 2,760,518 A | 8/1956 | Peet |
| 3,075,576 A | 1/1963 | Herbert |
| 3,169,551 A | 2/1965 | Lewis |
| 3,230,975 A | 1/1966 | Mercier |
| 3,318,251 A | 5/1967 | Smith |
| 3,730,307 A | 5/1973 | Mitchell |
| 3,756,367 A | 9/1973 | Mitchell et al. |
| 3,792,721 A | 2/1974 | Zahid |
| 3,857,413 A | 12/1974 | Zahid |
| 3,863,947 A | 2/1975 | Weston |
| 3,870,335 A | 3/1975 | Schultz |
| 3,882,953 A | 5/1975 | Maisch |
| 3,882,954 A | 5/1975 | Inoue |
| 3,887,027 A | 6/1975 | Allison |
| 3,897,846 A | 8/1975 | Inoue |
| 3,958,656 A | 5/1976 | Niemann |
| 3,960,179 A | 6/1976 | Zahid |
| 3,961,646 A | 6/1976 | Schon |
| 4,008,782 A | 2/1977 | Chanal |
| 4,088,154 A | 5/1978 | Patton et al. |
| 4,349,079 A | 9/1982 | Leiber |
| 4,359,123 A | 11/1982 | Haupt et al. |
| 4,410,193 A | 10/1983 | Howard |
| 4,418,931 A | 12/1983 | Howard |
| 4,467,884 A | 8/1984 | Robertson et al. |
| 4,503,678 A | 3/1985 | Wimbush |
| 4,506,507 A | 3/1985 | Wimbush |
| 4,534,577 A | 8/1985 | Howard |
| 4,558,878 A | 12/1985 | Motrenec |
| 4,566,712 A | 1/1986 | Motrenec |
| 4,585,400 A | 4/1986 | Miller |
| 4,588,198 A | 5/1986 | Kanazawa et al. |
| 4,634,135 A | 1/1987 | Nakata et al. |
| 4,638,838 A | 1/1987 | Richard et al. |
| 4,669,567 A * | 6/1987 | Nakamura et al. .......... 180/415 |
| 4,722,545 A | 2/1988 | Gretz et al. |
| 4,828,063 A | 5/1989 | Ogura |
| 4,872,486 A | 10/1989 | Sugimura et al. |
| 4,903,973 A | 2/1990 | Bray |
| 5,076,383 A | 12/1991 | Inoue et al. |
| 5,313,389 A | 5/1994 | Yasui |
| 5,536,028 A | 7/1996 | Howard |
| 6,267,395 B1 | 7/2001 | Howard |
| 6,422,582 B1 | 7/2002 | Howard |
| 6,520,519 B2 * | 2/2003 | Howard .................... 280/89.13 |
| 6,520,520 B2 * | 2/2003 | Howard ....................... 280/90 |

* cited by examiner

Primary Examiner—Faye M. Fleming
(74) Attorney, Agent, or Firm—Nexsen Pruet Adams Kleemeier, LLC; Townsend M. Belser, Jr.

(57) ABSTRACT

A steer wheel control system having a centering unit for resisting off-center movement of the steered wheels of a vehicle and returning them to a selected center position after each such movement, and a trim unit for remotely varying the selected center position. A resistance force and a return force may also be varied remotely. A plurality of passages and check valves make the trim unit operable by a single solenoid valve mounted internally on an intermediate head between the trim unit and the centering unit.

15 Claims, 5 Drawing Sheets

PRECISION STEER WHEEL CONTROL SYSTEM WITH INTERNAL SOLENOID

FIELD OF THE INVENTION

This invention relates to vehicle steering systems and more particularly to a centering device for controlling the steerable wheels of a vehicle such as a motor home, bus, truck, automobile or the like so that a center steering position is selected and maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway vehicles and the like are designed primarily for driver control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

Vehicles with steering systems having positive caster generally track relatively straight ahead and generally resist normal steering inputs away from center, including those of the driver. Intentional turning maneuvers by the driver therefore require sufficient turning force to overcome this positive resistance to movement away from center. When the driver relaxes the turning force applied to the steering wheel, a positive caster system has a definite tendency to return to its straight ahead position, although it may overshoot the neutral or center position if the steering wheel is entirely released.

While positive caster is desirable in some respects, it is not without compromises over the full steering spectrum. For example, the adverse effects of strong gusty cross winds are usually more pronounced with positive caster. As its name would imply, the vehicle tends to caster towards the side of the roadway to which it is being pushed by the wind. Similarly, a high crown at the center of the roadway or a slanted roadway can cause vehicles to turn toward the edge of the roadway, that is, in the downhill direction. In addition, generous positive caster provides significant resistance to small radius turns, which can make city driving quite fatiguing. These three adverse effects are some of the negative aspects of achieving steering stability through generous amounts of positive caster.

Another drawback of prior art steering systems is that spurious inputs transmitted from the roadway through the steerable wheels affect substantially the entire steering assembly before encountering any stabilizing resistance from the steering wheel. The negative action of the steerable wheels is caused by spurious steering inputs from crosswinds, slanted or crown roads, bad road surfaces, and other adverse dynamic steering forces. Inherent geometric steering characteristics may also be responsible for spurious steering inputs.

The transmission of these various inputs between the steerable wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steerable wheels, and significantly reduces driver fatigue because it results in a major reduction in driver steering inputs. This is accomplished by allowing the driver to easily make small adjustments in the centered position of the steering system to fine tune steering of the vehicle during its operation. Such fine tuning is made while driving, and makes driving more pleasurable and less fatiguing.

The invention thus comprises a precision steer wheel control system having a center position which is remotely adjustable to permit the driver of a vehicle to change and reset the center position of the vehicle's steering system to compensate for new or changed steering forces which would otherwise cause the vehicle to deviate from its straight ahead course.

In addition, the control system of the invention provides remotely adjustable levels of resistance force for opposing off-center steering movements and of centering force for returning the steering system to its center position after a turning movement. The adjustment means also provides for different levels of steering force to initiate or breakaway into a steering movement away from center. This level of force is sometimes referred to in this specification as the "break away resistance". Different levels of break away resistance and of resistance force may be appropriate to compensate for different steering system characteristics on the same or different types of vehicles and/or for changes in the forces acting upon the vehicle. The level of break away resistance and of resistance force opposing movement away from center may be remotely adjusted either by a control mechanism operable by the driver or by a microprocessor responsive to the speed of the vehicle.

The return force for returning the steering system to center may also be remotely adjusted either by a control mechanism operable by the driver or by a microprocessor responsive to the speed of the vehicle. Both the resistance force and the return force provided by the control system are increased or decreased to provide a level of force sufficient to overcome any spurious steering inputs and to suit driver road feel, particularly a feel of the steering wheel that lets the driver know when the steered wheels are beginning to move away from center and are closely approaching return to center.

The control system may be left on continuously because it will automatically turn off with the ignition and come back on when the engine is started. With any malfunction of the vehicle's power steering, an automatic disabling feature of the invention shuts the control system completely off.

The invention also provides a distinctive feel when approaching or leaving the center position. Thus, the sense of touch is added to the visual sense to aid control of the vehicle and reduce driver fatigue. The turning resistance selected should satisfy the road feel desired by the driver and be sufficient to overcome anticipated spurious inputs.

In the absence of the invention, spurious inputs to and/or mechanical slack in the steering assembly require almost constant manipulation of the steering wheel by the driver and make it almost impossible for the driver to hold the vehicle on a true straight ahead course. Use of the invention therefore permits a substantial reduction or elimination of the caster angle for vehicles previously requiring positive caster, thereby significantly reducing the crosswind effect and providing the driver with a positive touch control not heretofore attainable with positive caster. Positive stability is thereby achieved for previously unstable steering systems.

In addition, less manipulation of the steering system provides a substantial reduction in tire wear, particularly for large vehicles. It is estimated that use of the invention on large trucks in the United States alone may reduce tire replacement costs by as much as 3 billion dollars over a five year period.

Although the present invention is particularly useful as a centering mechanism for the steering systems of motor vehicles, it can be employed to position any steerable member moveable to either side of a preselected position. For example, the control system can keep an outboard motor centered so that a boat follows a straight course over the water in the presence of spurious steering forces produced by wind and wave action. The control system can also be used to center such steerable members as the rudders of ships or airplanes and the tongues of tandem trailers or railway cars.

The control system is useable with both power and non-powered steering systems, with the level of compensating forces provided usually being less for vehicles without power steering.

The control system may be used with steering systems having a reduction gear between the steering wheel and the steerable wheels. In this application, the control system is preferably connected to the steering system at a location between the steerable wheels and the reduction gear so as to be unaffected by any slack in the reduction gear or in components and connections between the reduction gear and the steering wheel. It is therefore on the slow side of the reduction gear ratio. The invention thus provides a zero backlash hydraulic centering assembly.

The centering assembly of the control system is preferably connected between the steering system and the front axle or a frame member of the vehicle in a position that allows the steerable member to move through its full range of steering movements while providing sufficient leverage for the assembly to resist movement of the steerable member away from the center position producing straight ahead travel of the vehicle. The steering system connection may be made to any steering system component providing appropriate range and leverage, such as a tie rod which joins the two front steerable wheels of a highway vehicle, or the pitman arm connected to the reduction gear. The frame connection may be made to any component serving as a fixed mounting relative to the steering system. This fixed component may be a frame member, or an axle or some other part carried by the vehicle frame instead of an actual frame member.

The preferred embodiments of the invention therefore have the following features: resistance force for opposing steering movement away from center and return force for return to center each of sufficient magnitude to overcome spurious steering inputs, remotely variable levels of resistance force and return force through a predetermined range of turning movement, remotely trimmable center position, no substantial overshoot, free return to center position, fail-safe mode for disabling the control system in the absence of power steering, precision and slack-free centering, slack free trimming, dampening of erratic steering movements, compact size, utility for old and new vehicles with or without power steering, and distinctive driver road feel.

It follows that a principal object of the present invention is to provide a power centering control system having the foregoing features and attachable to a vehicle steering system to reduce automatically the driver inputs required to maintain a preselected straight ahead course for the vehicle. To accomplish this, the present invention offsets spurious steering inputs with an opposing resistance force sufficient to keep the steerable wheels or other steering member in a selected center position for maintaining straight ahead vehicle travel. Accurately holding the steerable wheels on center prevents road wander, slanted road steering wheel pull, steering over-control, crosswind steering effect, and steering induced dynamic sway. Improvement in rutted road steering may also be realized. In addition, the positive centering feature gives the steering system designer greater latitude in reducing or eliminating the caster angle of the kingpin, which will reduce or eliminate the crosswind steering effect.

The manner in which the present invention accomplishes the foregoing objectives and advantages will now be described. The resistance force is provided by a zero backlash hydraulic centering assembly that is preferably attached at one end to a fixed frame member and at the other end either to the steering gear pitman arm or directly to the steering system tie rod. The assembly comprises a centering cylinder containing two pistons having rest positions against a center stop that holds an enlarged head of a piston rod captive in an on-center position. When the steered wheels are turned away from center, one of the pistons is displaced by the piston rod head. When the driver releases the steering wheel, the displaced piston returns the piston rod head and the steering system to their on-center positions. A hydraulic pressure source maintains substantial pressure in cylinder chambers on one side of each piston and this pressure causes the captured piston rod head to keep the steered wheels on center, tracking with accuracy that is not achieved with any other method.

The hydraulic pressure source is preferably an air over hydraulic pressure accumulator that includes a reservoir for the hydraulic fluid. Air pressure from a pressurized air source, such as an onboard compressor, a vehicle airbrake system or some other conventional air pressure source, is regulated by a control on the driver control panel. The accumulator has a flexible diaphragm that defines separate air and liquid chambers. By selectively varying the pressure within the air chamber, hydraulic fluid pressure and resulting forces applied to the dual pistons are varied, thereby varying the resistance to off-center movement of the steering system, as well as the return force for recentering the steering system. A pressure relief valve may communicate with the air chamber side of the accumulator to provide an upper limit to the resistance and return forces that may be generated by contact between the respective pistons and the piston rod head therebetween.

The turning resistance of the present invention is therefore provided by delivering fluid under pressure to the centering cylinder from a fluid pressure accumulator which may take a variety of forms and may be hydraulic, pneumatic or a combination of both. A pressure control device permits the level of resistance to movement away from center and the level of return force to be controllably varied, either by a hand mechanism operable by the driver or by a speed control mechanism responsive to the speed of the vehicle. In a preferred embodiment of the invention, the centering cylinder is preferably pressurized by liquid from the accumulator, and liquid in the accumulator is preferably pressurized by an air system of the vehicle.

The pressure accumulator may be protected from moisture by suitable air filters and/or dryers. Dual electric pneumatic valves, one on top and one on the bottom of the accumulator, automatically dump the air pressure when the system is turned off. The air pressure in the accumulator is automatically recharged each time the system is turned on, thereby eliminating a recharge maintenance function. On systems supplied by an air compressor, the discharge from the upper accumulator dump valve may be routed to the compressor inlet filter for providing a backflush function to keep this compressor filter clean.

It is also within the scope of the present invention to pressurize the centering cylinder using other liquid or air pressurization systems. For example, a pressure accumulator system of the type described in my prior U.S. Pat. No. 4,410,193 may be employed for storing and providing hydraulic fluid under pressure to the centering cylinder. Regardless of the type of fluid pressurization system employed, the system should generate sufficient pressure to return the respective centering pistons to their center rest positions against the central centering stop of the centering cylinder upon cessation of intentional steering inputs. The pressurization system should also constantly bias the centering pistons into engagement with both the centering stop and the piston rod head at all times when the control system is activated and in its center position so that there is no slack in the control system linkages at any time during its operation.

Spurious steering inputs tending to move the tie rod in either direction are therefore resisted by a corresponding resistance force generated by interaction between a corresponding piston and the piston rod head. Only when intentional steering wheel forces exceed a selected break away level will the tie rod of the steering system generate sufficient linear force on the piston rod to cause its head to move off center along with the piston corresponding to the direction of the desired turning movement.

A remotely operable trimming means is provided for controllably varying the selected center position of the steerable member to be maintained by the control system. In particular, a trim rod connected to a trim piston is arranged for movement in either direction within a hydraulic trim cylinder. The distal end of the trim rod is pivotally connected to either the steering system or the vehicle frame, depending on which of these is opposite from the distal end connection of the centering rod. Hydraulic fluid from the fluid system accumulator is supplied to opposite sides of the trim piston and its flow is controlled by a trim valve means operated by a single trim solenoid to allow movement of the trim piston and its rod.

A particularly important feature of the present invention is the location of the trim solenoid, which is positioned within the innermost centering chamber where it is mounted on an intermediate head between this chamber and the innermost trim chamber. A special recess is provided in the innermost centering piston to receive the projecting structure of the solenoid and thereby prevent any interference between this structure and compressive movement of the piston. Compared to centering assemblies with externally mounted solenoids, such as described in my prior U.S. Pat. No. 5,536,028, this arrangement greatly increases the compactness and symmetrical shape of the assembly, allowing it to be more easily handled and installed in a smaller space.

The trim cylinder is separate from, but integrally attached to, one end of the centering cylinder. The trim piston preferably can move about one-half inch to about one inch to either side of its center position in the trim cylinder, i.e., the total stroke of the trim piston is preferably in the range of about one inch to about two inches. The hydraulic fluid in this short trim cylinder is trapped on opposite sides of the trim piston by the trim valve when it is closed, creating a hydraulic lock that holds the centering stop of the centering cylinder in a selected on-center position.

When an electric trim button is activated, the solenoid operated trim valve opens, allowing fluid to pass from one side of the trim piston to the other. This causes the centering cylinder (and its centering stop) to move precisely by the amount necessary to coincide with the straight ahead direction that the vehicle is being steered. Releasing the trim button allows the trim valve to close, recreating a hydraulic lock in the trim cylinder to hold the centering assembly in the new on-center position to which it has been trimmed. The average trim corrections may be on the order of a few one-thousandths of an inch. A liquid trimming fluid is preferred because it is substantially incompressible as compared to a gaseous trimming fluid and therefore provides the capability of locking the trim piston in its trimmed position without appreciable slack.

A driver control panel makes it possible for steering corrections to be made while driving. The panel may be conveniently located near the driver and provides three basic functions, namely, a switch to turn the system on and off, a centering effectiveness control, and a trim control such as a momentary trim switch. Activating and adjusting the centering force and trimming the centering system is therefore an easy and natural driving function. Should the driver sense a degree of steering wheel pull that becomes a bother, it is then quickly eliminated by momentarily pressing the trim switch.

The apparatus includes control means for remotely and selectively varying both the amount of resistance to movement away from center and the selected center position of the steerable member(s) relative to the vehicle frame. Both of these remote adjustments are preferably made by the driver while the vehicle is in operation. Therefore, electrical control and fluid control systems are employed for remotely operating the centering and trimming units of the centering assembly from the driver's station of the vehicle. The electrical controls may comprise one or more switches preferably having a toggle design that is spring-biased to a circuit-open position. Such switches are closed only momentarily when the toggle is held in a depressed position against the spring bias. Thus, the internal trim solenoid is actuated only while the toggle is depressed. Release of the toggle opens the circuit and stops the trim adjustment at the point selected.

My earlier U.S. Pat. No. 4,410,193, No. 4,418,931, No. 4,534,577 and No. 5,536,028, the entire contents of which are expressly incorporated herein by reference, solved many of the shortcomings existing in the prior art. The present invention provides improvements over these earlier patents, especially in the areas of compactness, ease of handling, simplicity, precision, and reliability.

BRIEF DESCRIPTION OF THE DRAWINGS

The invention, both as to its structure and operation, may be further understood by reference to the detailed description below taken in conjunction with the accompanying drawings in which.

DETAILED DESCRIPTION OF THE INVENTION

Figure 1:
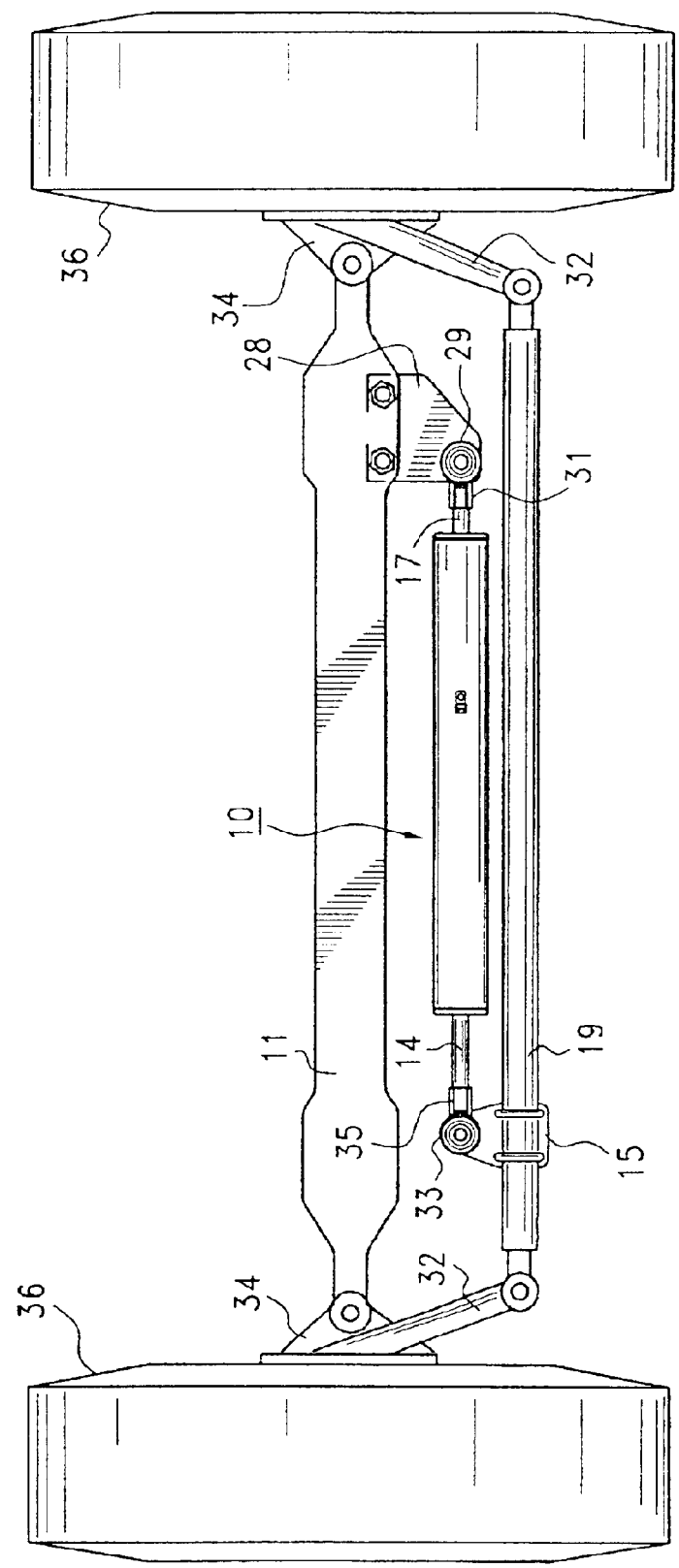
FIG. 1 is a plan view illustrating installation of the centering assembly of the invention between the frame and steering system of a motor vehicle.

The precision steer wheel control system of the present invention comprises a power centering assembly, generally designated 10, which may be connected between a front axle 11 and the tie rod 19 of a conventional motor vehicle as shown in FIG. 1 of the drawings. The steering system components shown are conventional and include bell cranks 32—32 carried by knuckles 34—34 which support steerable wheels 36—36 for pivotable turning movement about kingpins 31—31 mounted on the vehicle frame. Steering inputs by the driver are transmitted to the tie rod 19 by the pitman arm (not shown) of the steering gear. The outer end of a centering rod 14 of assembly is 10 is connected to the tie rod 19 by means of a mounting bracket 15 that carries the ball element of a ball joint 33 connected to the outer rod end by a connection 35 threaded and clamped thereon (FIG. 3).

Figure 2:
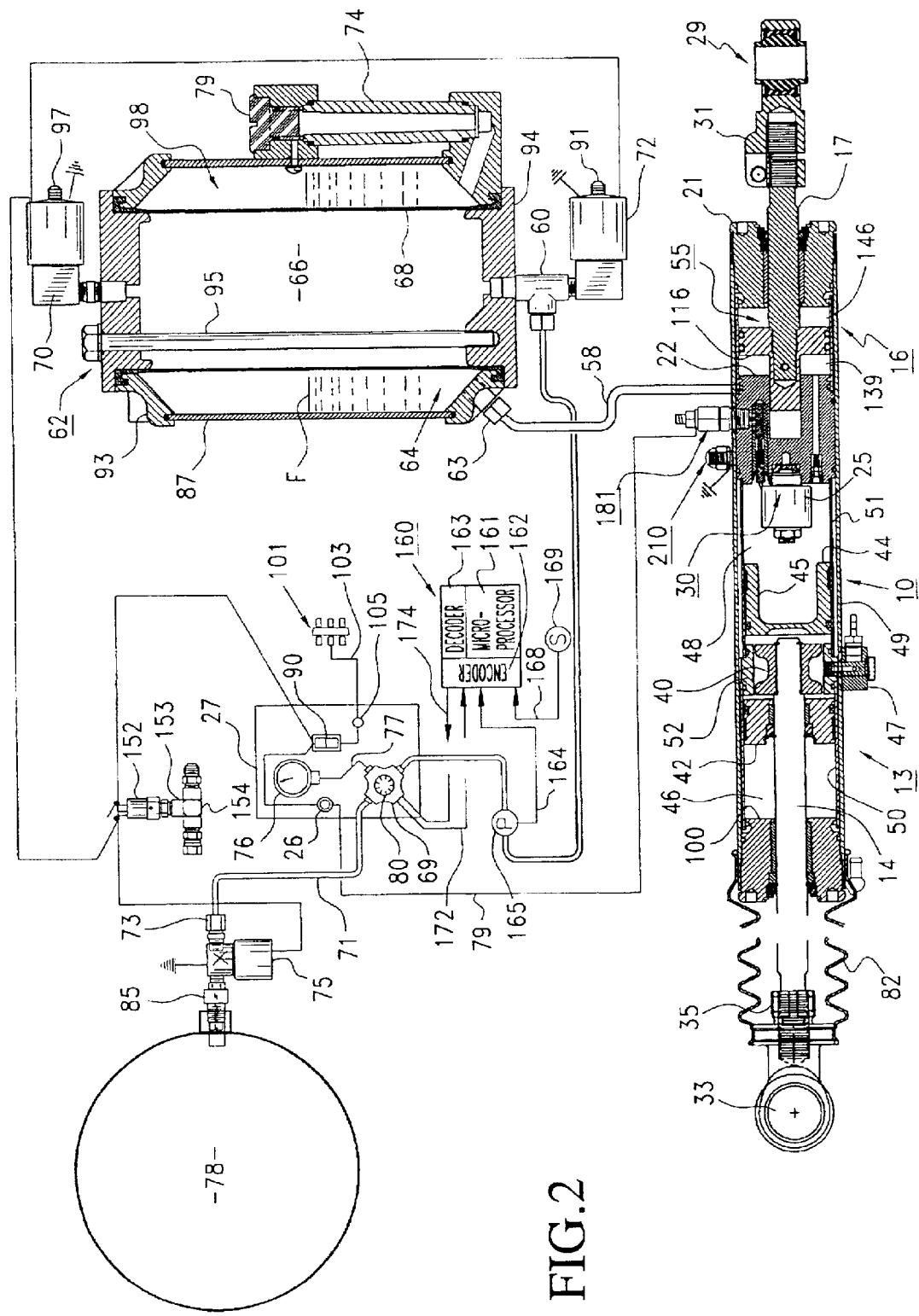
FIG. 2 is a schematic diagram of the fluid and electrical systems and of the major components of the invention, and includes sectional views showing structural details of the accumulator, the centering unit and the trim unit.
Figure 3:
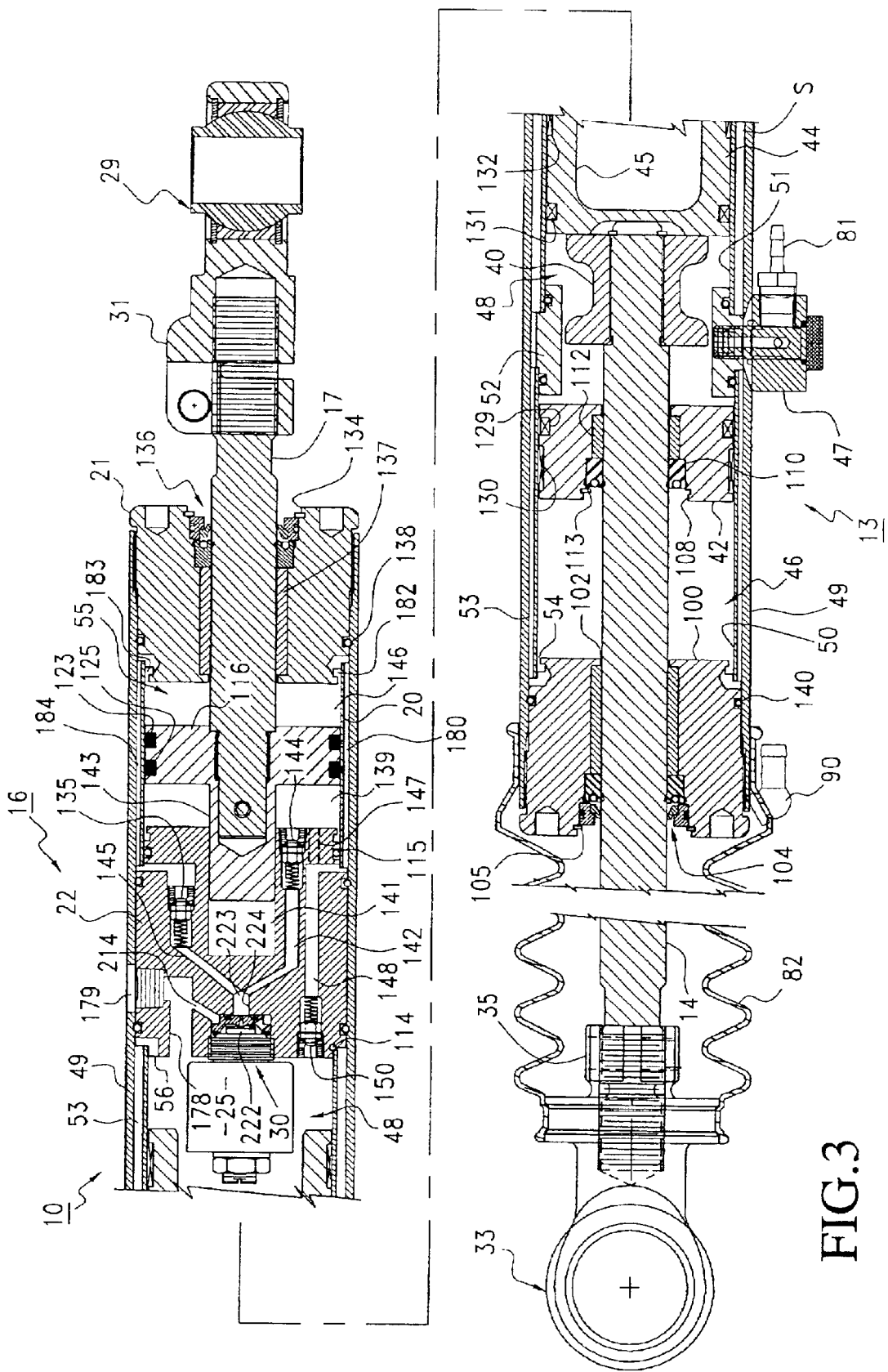
FIG. 3 is an enlarged partial sectional view of the centering and trim units of FIG. 2.

As may be seen best in FIGS. 2 and 3, the power centering assembly 10 includes a centering unit 13 having a centering rod 14 extending outward from one end and a trimming unit 16 at the other end. The trimming unit 16 includes the trim rod 17, cylinder 20 having an end head 21 and an intermediate head 22, and a trim valve assembly 30 carried by the intermediate head 22 as described further below. The trim valve 30 is actuated by a solenoid 25 in response to a driver of the vehicle pushing a trim button 26 on a control panel 27, which is preferably located at or near the driver's station of the vehicle. The components mounted on the driver control panel 27 make it possible for the corresponding steering corrections to be made while driving the vehicle. Should the driver sense a degree of steering wheel pull that becomes a bother, it is then quickly eliminated by pressing the trim switch.

Trim button 26 actuates an electrical switch of a toggle design that is spring-biased to a circuit-open position. Such switches are closed only momentarily when the toggle is held in a depressed position against the spring bias. Thus, the trim adjusting solenoid 25 is actuated only while the toggle is depressed. Release of the toggle opens the circuit and stops the trim adjustment at the point selected.

The trim rod 17 is connected to the axle 11 by means of a mounting bracket 28 that carries the ball element of a ball joint 29 connected to the outer end of trim rod 17 by a connection 31 threaded and clamped thereon. The ball joints 29 and 33 permit pivotal movement in the horizontal plane and to a limited extent in the vertical plane, and are conventional joints wherein an enlarged spherical end on a rod or stub is held for pivotable movement within a surrounding journal structure carried by an arm-like member. In FIGS. 2 and 3, the ball joint 33 is shown as if rotated 90 degrees from its true operating position, which is in the horizontal plane the same as ball joint 29, to illustrate a top view of these joints.

The components of the centering system and the way in which they center and stabilize a vehicle steering system will now be described. It is to be understood that each of the components described are connected together by appropriately sized fluid conduits and electrical wires and that these conduits and wires are represented by the lines interconnecting the components as shown.

Referring to FIGS. 2 and 3, there is shown a specific structural arrangement of the components preferably incorporated in or attached directly to the centering unit 13. A cylindrical assembly housing 49 encloses two separate interior centering cylinders 50 and 51, the adjacent ends of which are connected together by a collar 52. The centering cylinders 50 and 51 contain centering pistons 42 and 44, respectively. An enlarged rod head 40 is keyed and fastened to the inner end of centering rod 14. Head 40 is positioned between opposing faces of centering pistons 42 and 44 and serves as the actuator for these pistons.

A special recess 45 is provided in the innermost centering piston 44 to receive the projecting portion of the solenoid actuator 25, which is mounted on the intermediate head 22 internally within the centering chamber 48 defined by centering cylinder 51. This arrangement provides a centering assembly structure that is highly compact and easily handled, while preventing any interference between the internally mounted solenoid and compressive movement of the adjacent centering piston.

A breather and drain fitting 47 is carried by collar 52 to allow air to enter and leave the space between pistons 42 and 44 as they reciprocate in cylinders 50 and 51, and to drain away any leaking hydraulic fluid. Fitting 47 vents via a breather line 81 to a vent reservoir (not shown) or directly to ambient. The end portion of centering rod 14 projecting beyond assembly housing 49 is surrounded by a dirt and grease barrier in the form of a flexible bellows 82, which is also vented to the vent reservoir or to ambient by a breather fitting 90. As the pistons 42 and 44 move in response to steering movements, air flows back and forth in breather fittings 81 and 90.

The end of cylinder 50 opposite to collar 52 is closed by a head 100 having a journaled and sealed aperture 102 for sliding passage of centering rod 14. Around aperture 102 is a set of multiple seals 104 held in place by a snap ring 105, and the head 100 is secured in place by being threaded or crimped into the assembly housing 49. Piston 42 has a sealed is aperture 108 for sliding passage of centering rod 14 during its movement of piston 44. A piston rod seal 110 and journal 112 are secured in piston 42 by a snap ring 113.

The end of cylinder 51 opposite to collar 52 is closed by the intermediate head 22 of trim cylinder 20, and these two centering cylinders, the intermediate head, and the trim cylinder 20 are all secured together by the outer end heads or caps 21 and 100, which are threaded or crimped into the housing 49 at positions beyond seal rings 138 and 140, respectively. In FIG. 3, centering piston 44 is shown moved away from collar 52 by piston head 40 and centering piston 42 is shown in its fully retracted position against collar 52. Both pistons are arranged for compressive movement toward the opposite ends of their respective chambers, piston 42 traveling in chamber 46 and piston 44 traveling in chamber 48 within cylinders 50 and 51, respectively.

The retracted position of each piston is defined by the internal annular collar 52, which serves as a piston stop and preferably has an axial width substantially (preferably within one-ten thousandth of an inch) equal to the axial thickness of rod head 40. A stop width greater than the head thickness is undesirable because gaps between opposing surfaces would allow unbiased movement (slack) between rod 14 and cylinders 50 and 51. A stop width less than the head thickness is also undesirable because this would let fluid flow back and forth between chambers 46 and 48 through a connecting conduit 53 so that the pistons 42 and 44 would move (drift) together until one of them bottoms out against the collar 52, there being no pressure differential applied to the rod head during such joint piston movement. Accordingly, the pressurization system constantly biases the centering pistons into substantially simultaneous engagement with both the centering stop and the piston rod head at all times when the control system is activated and the steering system is in its center position so that there is no significant slack or drift at any time during its operation.

Near the end of each centering chamber opposite to the retracted piston position is a single port for communicating fluid pressure to the chamber, port 54 serving chamber 46 and port 56 serving chamber 48. Ports 54 and 56 are connected together by the conduit 53, which in turn is connected via the trim valve assembly 30 and a hydraulic conduit 58 to an accumulator 62, which provides hydraulic fluid under pressure to the centering chambers 46 and 48.

The vehicle steering system is properly centered when pistons 42 and 44 abut collar 52. In order to move or break away from collar 52, these pistons must overcome the resistance provided by accumulator pressure acting through the conduit 58, which preferably contains an in-line filter (not shown). An optional feature of the centering unit is that the diameters between cylinders 50 and 51 may be different, the diameter of cylinder 50 being larger by an amount sufficient to produce equal centering forces on pistons 42 and 44 in spite of the area of piston 42 lost because the centering rod 14 passes therethrough. Thus, to provide equal working areas, the cross-sectional area of cylinder 50 and the annular surface area of piston 42 may be greater than the corresponding areas of cylinder 51 and piston 44 by the amount of piston area lost by reason of rod aperture 108 in piston 42. This is illustrated in FIG. 3 by the space S between centering cylinder 51 and assembly housing 49, which is substantially greater than the corresponding space between centering cylinder 50 and the assembly housing.

The accumulator 62 has an annular liquid chamber 64, a central gas chamber 66 separated from the liquid chamber by a flexible bladder 68, and solenoid operated upper and lower gas dump valves 70 and 72. A liquid resistance fluid is preferred because it provides a viscous dampening action for tire blowout protection as the liquid is forced to flow through the various ports and passages between centering chambers 46 and 48 and between these chambers and accumulator 62. A liquid trimming fluid is preferred because it is substantially incompressible as compared to a gaseous trimming fluid and therefore provides the capability of locking the trim piston in its trimmed position without appreciable slack.

Bladder 68 is preferably made of neoprene. Accumulator 62 also includes an upper head 93 and a lower head 94 spaced apart by an outer housing wall 87 and secured together by peripherally spaced bolts 95, only one of which is shown in FIG. 2. Gas chamber 66 is connected to a compressed gas source 78 via a fitting 60, conduit 67, a pressure regulator 69, a conduit 71, a check valve 73, a solenoid operated cut-off valve 75, and a restrictor orifice 85 for limiting the flow rate to regulator 69.

The gas pressure in chamber 66 is indicated by a pressure gauge 76 which is connected to pressure regulator 69 by a conduit 77. The gas is preferably air, and both the bladder 68 and the surrounding housing wall 87 of accumulator 62 are preferably cylindrical. The gas pressure source 78 may be a pressurized air source, such as an onboard compressor, a vehicle airbrake system or some other conventional air pressure source, and gas pressure is regulated by a control knob 80 on the driver control panel 27.

Centering cylinders 50 and 51, trim cylinder 20, trim valve 30 and accumulator 62 are preferably positioned relative to each other, and conduit 58 is arranged, such that any gas bubbles in the cylinders and trim valve flow through conduit 58 and into the accumulator via a fitting 63. Upon entering accumulator 62, any gas bubbles rise to the liquid and gas interface F such that the gas accumulates in an upper portion of liquid chamber 64 where it provides an air cushion 98, which may serve the same purpose as the pressurized gas in chamber 66. This insures precision trimming without backlash or drift of the center position, which otherwise could be caused by gas bubbles in the trimming cylinder.

The foregoing features also eliminate the need for a service air bleeding operation after the system is filled with original or replacement hydraulic fluid via a fill tube 74 having a threaded cap 79. In other words, the invention comprises a self-bleeding means that assures a bubble-free system capable of holding a close centering tolerance automatically.

Gas chamber 66 should be large enough for liquid chamber 64 to receive the entire volume of fluid from either centering chamber 46 or 48 without unduly collapsing bladder 68. A bleed flow path through dump valve 70, which is open when switch 90 is turned off, allows liquid chamber 64 to be partially filled with hydraulic fluid up to the level of the top of the fill tube 74.

Gas pressure in chamber 66 acts through bladder 68 to store fluid energy received from the hydraulic side of the system, and to maintain fluid pressure on the liquid side of the respective pistons 42 and 44 until such time as the gas pressure is released to ambient atmosphere by actuation of dump valves 70 and/or 72 in response to turning off the system with an on-off switch 90. Switch 90 is connected to an electrical buss 101 by a line 103 containing a circuit breaker 105. The lower dump valve 72 includes a drain line 91 and has the dual purpose of discharging both gas and any liquid (such as condensed water) accumulating in gas chamber 66. A pressure relief valve (not shown) may communicate with the gas chamber side of the accumulator to provide an upper limit to the resistance and return forces that may be generated by contact between the respective pistons and the piston rod head therebetween.

The air pressure in the accumulator 62 is automatically recharged each time the system is turned on, thereby eliminating a recharge maintenance function. The gas conduit 71 may include suitable air filters and/or dryers (not shown). On systems supplied by an air compressor, the discharge from the upper accumulator dump valve 70 may be routed to the compressor inlet filter (not shown) for providing a backflush function to keep this compressor filter clean.

As it is best to deactivate assembly 10 in the event of a failure of the power steering system, a switch 152 for interrupting electrical power to solenoid valves 70, 72 and 75 may be provided for vehicles with power steering systems. Switch 152 is mounted on a pressure sensor 153 located in a hydraulic line 154 in fluid communication with the outlet of the power steering pump (not shown). A loss of pressure at the pump outlet causes switch 152 to open, thereby causing gas supply valve 75 to close and dump valves 70 and 72 to open for depressurizing gas chamber 66, which in turn depressurizes liquid chamber 64 and centering chambers 46 and 48 connected thereto. Vent lines 91 and 97 are each preferably of larger capacity than gas supply conduit 67 to ensure that gas chamber 66 will be depressurized even if gas supply valve 75 fails to close and either dump valve 70 or 72 fails to open with the opening of pressure switch 152.

Accumulator 62 allows hydraulic pressure in the centering chambers 46 and 48 to be precisely varied over a relatively wide range because the gas trapped in gas chamber 66 provides a spring-like return force and this chamber may be sized such that the return force does not vary significantly with compressive piston movement. The gas pressure control may comprise a manual throttle valve (not shown) between conduits 71 and 67, in combination with the pressure gauge 76 to indicate accumulator pressure.

Alternately, the pressure regulator 69 may be used for maintaining a manually selected system pressure. The control knob 80 is provided to permit varying the pressure settings of the regulator by hand. By varying the gas pressure in gas chamber 66 through adjusting pressure regulator 69, the break away resistance and the centering return force produced by the centering assembly of the invention can be increased or decreased as desired. The range of pressures available should be selected so that break away resistance can be varied from relatively low at low speeds to relatively high at high speeds.

For lighter vehicles, such as automobiles and pickup trucks, the accumulator pressure and other control system parameters may be chosen so that a linear break away steering force of at least about 30 pounds, preferably at least about 50 pounds, more preferably at least about 100 pounds, and most preferably at least about 150 pounds, must be applied to the tie rod by the pitman arm in order to initiate a break away turning movement of the steerable wheels. For heavier vehicles, such as eighteen wheel trucks and motor homes, these parameters may be chosen to require a linear break away steering force of at least about 200 pounds, preferably at least about 300 pounds, and more preferably at least about 350 pounds. These turning forces are opposed by equal turning resistances which should be maintained for at least small turning angles away from center, preferably 0°–5°, more preferably 0°–3°, and most preferably within one degree on either side of center.

After linear movement of the rod head 40 is initiated upon breakaway, the steering force required to sustain movement is a function of the pressure in the accumulator, as well as of other centering phenomena acting on the steering system, such as positive wheel caster. Also after break away, accumulator pressure acting on the off-center piston provides a return force that may be effective over the entire range of turning angles, which for highway vehicles is usually limited to about 45° on either side of the center wheel position (the 0° position).

As an alternative to manual adjustment, the output pressure of regulator 69 may be adjusted by a reversible electric motor (not shown) controlled by an on-board computer 160, which comprises a microprocessor 161, an encoder 162 and a decoder 163. Encoder 162 converts to digital signals an analog signal 164 input from a pressure sensor 165 in the gas supply conduit 67, an analog signal 168 input from a vehicle speed sensor 169, and an analog signal 172 input from a position sensor (not shown) within regulator 69. Decoder 163 converts digital control signals generated by microprocessor 161 to an analog signal 174 for controlling the reversible electric motor which adjusts the output pressure provided by regulator 69.

The gas pressure in gas chamber 66 and the resulting resistance and centering forces are thereby made automatically responsive to the speed of the vehicle to provide "speed sensitive centering" of the vehicle's steering system. It is preferable that the resistance to turning movements away from the center position be increased automatically as the speed of the vehicle increases because the effects of small off-center movements in response to spurious steering inputs increase dramatically with vehicle speed.

The centered steering position to be maintained by the centering assembly 13 described above may be changed remotely by the trim assembly described below. The intermediate head 22 engages trim cylinder 20 beyond the end of cylinder 51 and trim cylinder 20 defines a trimming chamber, generally designated 55, containing a trim piston 116 secured and keyed to the inner end of the trimming rod 17.

For sealingly engaging trim cylinder 20, trim piston 116 carries two sets 123 and 125 of dual circumferential seals, each set comprising an outer seal of square cross section concentrically stacked on a more resilient seal of oval cross section to provide a close tolerance seal arrangement for substantially preventing any leakage past the trim piston. This precludes any significant drift of trim piston 116 away from its locked position for setting the on-center position of centering rod head 40. Similar sets 129–130 and 131–132 of close tolerance, dual circumferential seals are also preferably provided on centering pistons 42 and 44, respectively.

Trimming chamber 114 is closed at its inner end by the intermediate head 22 and at its outer end by the end head 21, which is secured in place by a threaded or crimped connection to the housing 49. The trimming rod 17 passes through an aperture 134 in end head 21 and this aperture contains a set of multiple seals 136 and a journal 137. An O-ring seal 138 is provided between head 21 and housing 49, and an O-ring seal 140 is provided between opposite end head 100 and housing 49.

Additional circumferential seals of either circular or rectangular cross section are provided on the intermediate head 22 as indicated by the small circles without cross-sectional lines in the cross-sectional view of these heads in FIG. 3.

A partially slanted passage 142 in the body of intermediate head 22 provides a direct outlet from trim chamber 139 on one side of trim piston 116, and a second partially slanted passage 145 provides an outlet from a trim chamber 146 on the other side of trim piston 116 via a port 183 and a housing passage 184. The passage 142 contains a check valve 144 and passage 145 contains a check valve 135 to prevent reverse flow into trim chambers 139 and 146, respectively.

The chambers 139 and 146 are arranged to receive hydraulic fluid to prevent retraction and extension, respectively, of trimming rod 17, when the solenoid activated trim valve 30 is closed.

The body of intermediate head 22 also contains a bore 141 for receiving and guiding an extension 143 of trim piston 116. In addition, the body of intermediate head 22 contains an axial passage 147 providing an inlet directly into trim chamber 139, and an axial passage 148 providing an inlet into trim chamber 146 via a housing passage 180 and a port 182. Passage 147 contains a check valve 149, and passage 148 contains a check valve 150 to prevent reverse flow out of trim chambers 139 and 146, respectively.

The fluid flow passages, valves and ports of the trimming assembly 16 and the centering assembly 13 will now be described with reference to FIGS. 3 and 4. Fluid may be supplied to or discharged from trim chambers 139 and 146 only when trim valve assembly 30 is opened by solenoid valve 25, such fluid being supplied to one trim chamber only while being discharged simultaneously from the other trim chamber.

More specifically, accumulator reservoir 64 is in fluid communication with a main passage 178 in intermediate head 22 via the conduit 58 and a housing port 179. Main passage 178 is in direct fluid communication with centering chamber 48 and chamber 48 is in fluid communication with centering chamber 46 via inner port 56, housing passage 53 and outer port 54.

When valve head 222 is lifted away from outlet 224 of solenoid valve chamber 223 and trim piston 116 moves inward relative to the housing 49, fluid is discharged from trim chamber 139 to conduit 58 via the head passage 142 containing check valve 144, a common passage 225, the outlet 224, the valve chamber 223, and a head passage 214 leading to the main head passage 178, housing port 179 and accumulator conduit 58. Simultaneously, fluid flows from centering chamber 48 into trim chamber 146 via head passage 148 containing check valve 150, housing passage 180 and port 182.

When valve head 222 is lifted away from outlet 224 of solenoid valve chamber 223 and trim piston 116 moves outward relative to the housing 49, fluid is discharged from trim chamber 146 to conduit 58 via port 183, housing passage 184, the passage 145 containing check valve 141, the common passage 225, the outlet 224, the valve chamber 223, the head passage 214 leading to the main head passage 178, housing port 179 and accumulator conduit 58. Simultaneously, fluid flows from centering chamber 48 into trim chamber 139 via head passage 147 containing check valve 149.

Optionally, the housing port 179 may lead directly into either chamber 48 or chamber 46, or into chamber 46 through its end head 100. A further option is to size passage 178 so that it functions as a flow restriction orifice to limit the rate of fluid flow into and out of centering chambers 46 and 48. The effect of such of a flow restriction in discharging fluid from the centering chambers is illustrated by the following example of centering unit operation.

Figure 5:
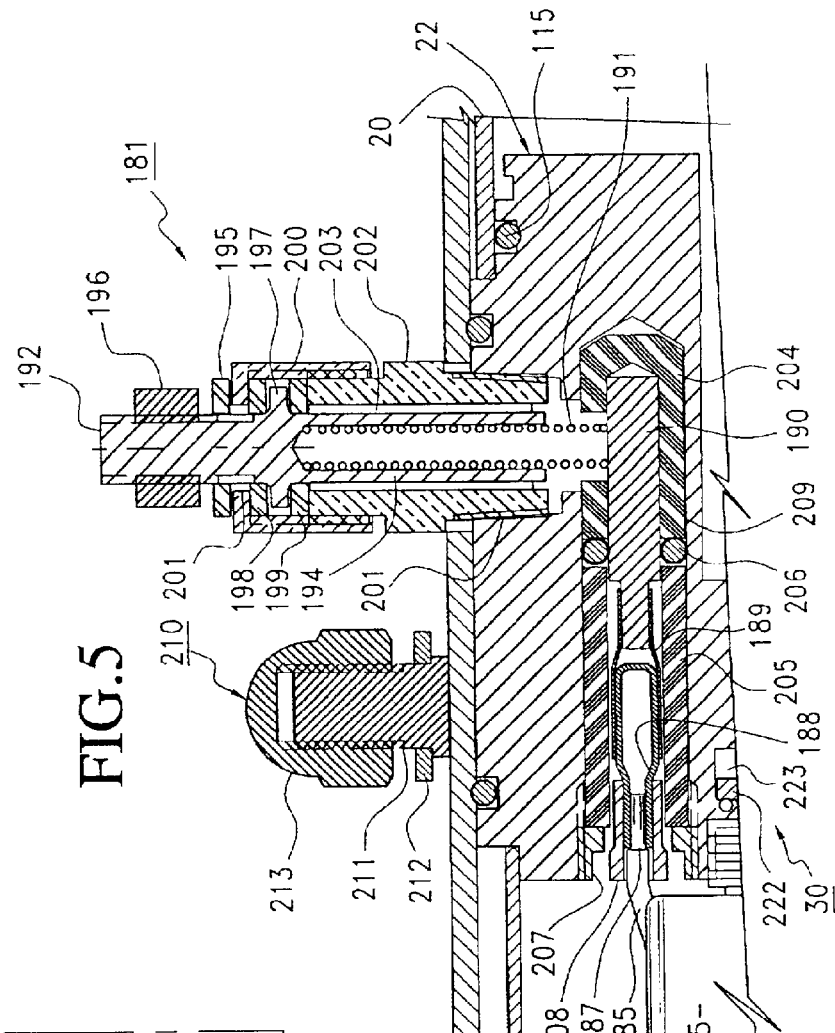
FIG. 5 is an enlarged fragmentary sectional view showing details of the electrical connection fittings for the trim unit solenoid of FIGS. 2–4; and, FIG. 6 is a schematic diagram of an optional auxiliary fluid system that may be utilized in the conduit between the accumulator and the housing of the centering assembly.

Referring now to FIG. 5, the internal solenoid 25 for actuating trim valve 30 receives electrical power from the trim switch 26 via an electrical line 79 and a special electrical connector, generally designated 181, that is mounted on intermediate head 22 and comprises the structure described below for connection to a male bullet connector 187 on the distal end of an insulated wire 185 leading to the solenoid. Bullet 187 slides within and is engaged by a hollow female connector or snap on plug 188 that in turn is connected to an axial stud 190 by a sheath connector 189. The axial stud 190 is resiliently engaged by a compressed coil spring 191 held in place by a transverse stud 192 having an inner barrel 194 for positioning and guiding the spring. A terminal eye on a power line (not shown) is secured between an insulating washer 195 and a lock nut 196 threaded onto a projecting distal end of the transverse stud 192. The bullet 187, plug 188, sheath 189, stud 190, spring 191, stud 192 and nut 196 are all made of an electrical conducting material, preferably of one or more metals.

An outer metal barrel 202 is threaded into a port 201 in the intermediate head 22 within the housing 49 and the transverse stud 192 is secured within the bore of this barrel by a cap 200 that has an aperture 201 for receiving the distal end of the stud 192 and that fits over and is threaded onto the exterior of this barrel. Tightening of the cap 200 causes a flange 197 on the stud 192 to be clamped between two insulating washers 198 and 199, thereby locking in position the stud and the spring 191 within its inner barrel 194.

The electrical circuitry of the solenoid 25 is grounded through the intermediate head 22, the housing 49 and a ground fitting, generally designated 210. The fitting comprises a threaded stud 211 fixed, as by welding, to the housing 49, and a threaded cap 213 for clamping the eye piece of a grounding wire (not shown) between this cap and a metal washer 212.

Since the housing 49, the outer barrel 202 and the inner barrel 194 are preferably made of an electrically conductive material, such as metal, a sleeve 203 of an insulating material, such as a phenolic resin, is inserted between the inner and outer barrels. Since the intermediate head 22 also is preferably made of an electrically conductive material, such as metal, the axial stud 190, sheath 189 and plug 188 are insulated from the wall of bore 209 in head 22 by jackets 204 and 205, which are preferably made of an insulating phenolic resin and are held in place by a retaining nut 207 threaded into an outer portion of the bore. Interposed between jackets 204 and 205 in bore 209 is a high pressure O-ring seal 206 for preventing any leakage of hydraulic fluid to ambient through the fitting 181. A slip on plastic insulator 208 is also preferably provided around the snap on connection between the bullet 187 and the plug 188 to insure that there is no contact between this connection and the surrounding metal nut 207.

The air chamber 66 of accumulator 62 may be pressurized by air to a pressure of, for example, 100 psig to provide the same pressure in each of the centering chambers 46 and 48. If the working area of each of the pistons 42 and 44 is 3.5 square inches, an accumulator pressure of 100 psig will provide a linear resistance force of 350 pounds as measured at the tie rod 19 for opposing off-center movement of rod head 40. Since many conventional steering system geometries provide a linear resistance force of about 15 to 20 pounds as measured at the tie rod, the present invention may be used to increase the resistance and re-centering forces of these steering systems by a multiple of about 5 to about 30 or more, preferably about 10 to about 25. A resistance force of 300 pounds or more is particularly effective in eliminating the adverse effects of crosswinds on large vehicles.

For a steer wheel control system having the foregoing characteristics, the flow restriction passage 178 may be sized at a diameter of about one-eighth inch. This passage size should not significantly affect off-center and return to center movements of the rod head 40 during normal steering and turning maneuvers in response to movements of the vehicle steering wheel. However, excessively rapid movement of the tie rod, such as may be caused by blowout of a steerable wheel tire, is viscously dampened by the flow resistance of passage 178 so that the course of the vehicle may be safely controlled with relatively little additional steering effort by the driver. To illustrate this viscous dampening effect, it has been determined that initiation of an excessively rapid tie rod movement, as might be experienced during a tire blowout, can increase the pressure in the centering chambers from 100 psig to 200 psig, the latter applying a linear force of about 700 pounds to the tie rod.

The remotely controlled trim valve assembly 30 operates as follows. If there is a roadway pull to the right, straight ahead travel will require a compensating steering force to the left from the steering wheel to move the centering piston 44 slightly to the right away from stop 52 as illustrated in FIG. 3. Such movement of piston 44 in its chamber 48 causes piston 42 acting against stop 52 to produce a differential pressure across trim piston 116 in trim cylinder 20. While holding the steering wheel in the position giving straight ahead travel, the trim button 26 is pushed momentarily to briefly actuate solenoid 25 and open trim valve 30, which allows fluid to be discharged from trim chamber 139 and supplied to trim chamber 146 such that cylinder housing 49 moves to the right and the differential pressure across trim piston 116 is removed by equalizing the pressures in trim chambers 139 and 146. Fluid flowing out of chamber 139 follows the return flow path toward conduit 58 as described above, and fluid supplied to trim chamber 146 follows the supply flow path from centering chamber 48 as also described above.

The movement of trim piston 116 in trim cylinder 20 causes centering piston 44 to be reseated in its rest position against stop 52, centering piston 42 remaining in its seated position against stop 52 during this trimming operation. After its momentary actuation, the trim button 26 is then released to deactivate solenoid 25 and close trim valve 30, which is held in its normally closed position by a compression spring (not shown). Trim piston 116 is thereby locked in its changed position corresponding to a new on-center position in which stop 52 is realigned with rod head 40. This new on-center position of stop 52 will then maintain the vehicle steering system in a newly centered condition, which provides straight ahead travel of the vehicle that is free from the previously experienced roadway pull to the right and will be maintained even when the steering wheel is released.

Figure 4:
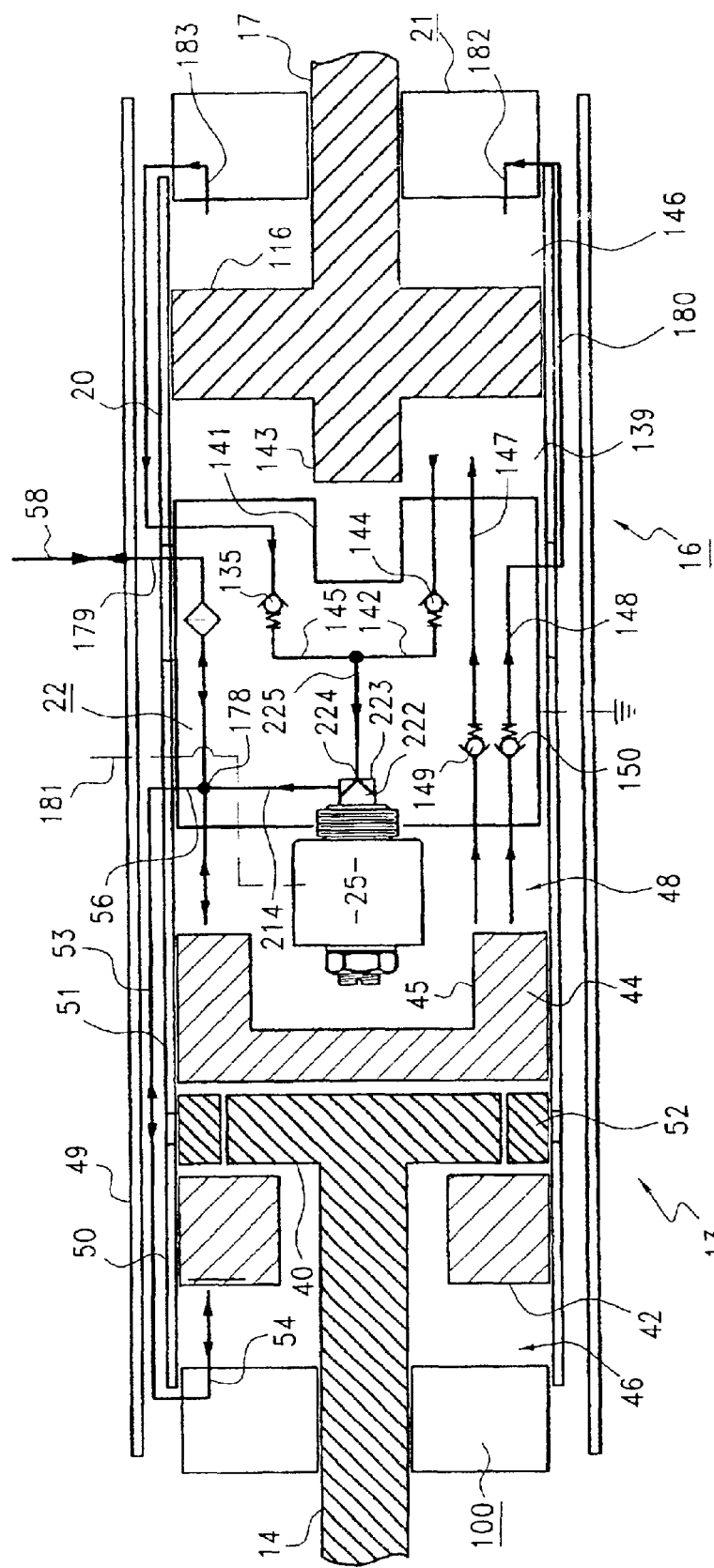
FIG. 4 is a schematic diagram of the hydraulic fluid system, including the fluid passages and valves of FIG. 3.

In FIGS. 2–4, the trim piston 116 is shown approximately in its center position within the trim cylinder 20. The trim piston preferably can move about one-half inch to about one inch to either side of its center position, i.e., the total stroke of the trim piston 116 is preferably in the range of about one inch to about two inches. The hydraulic fluid in this short trim cylinder is trapped on opposite sides of the trim piston by the trim valve 30 when it is closed, creating a hydraulic lock that holds the centering stop 52 between the centering cylinders 50 and 51 in a selected on-center position. The average trim corrections may be on the order of a few one-thousandths of an inch.

The tolerance for backlash (rebound) or drift in either direction of the trim piston in the trim cylinder is preferably held to one-thousandth of an inch. This close tolerance is achieved in several ways. The trim inlet passages are located near the bottom of the intermediate head 22 to prevent the intake of any gas bubbles that might form in centering chamber 48. On the other hand, main port 179 and main passage 178 are located at or near the top of head 22. This helps to insure that bubble free fluid is supplied to the trimming assembly by the accumulator, and that used fluid, which may contain gas bubbles, is returned directly to the accumulator without any chance of passing back into the trimming cylinder.

Figure 6:
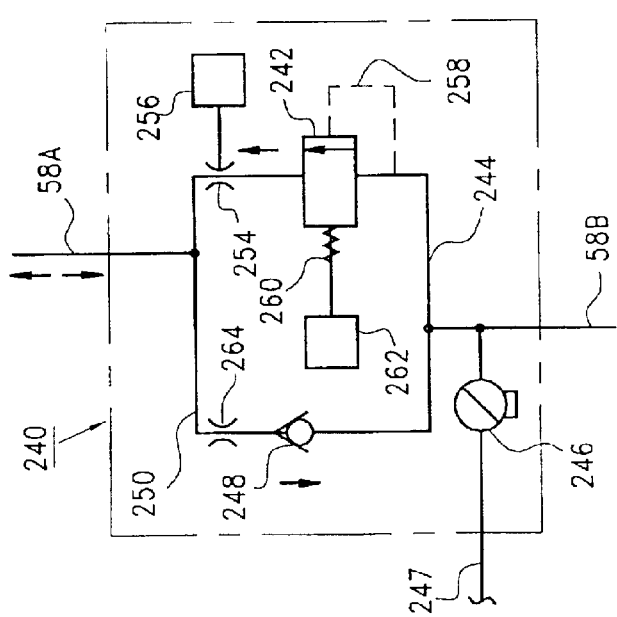

As an optional feature, an auxiliary centering fluid system 240 may be inserted into the accumulator conduit 58 between segments 58A and 58B thereof, as shown in FIG. 6, to provide additional power centering features. Thus, an additional level of resistance to be overcome before turning movement may be initiated is provided by a pressure differential valve 242 in a return conduit 244 also containing an orifice 254. Although accumulator pressure alone will resist off-center movement of the centering pistons in the absence of a pressure differential valve, this valve may be used so that the steering force required to make a turning movement away from center is substantially higher than the return force for returning the system to center upon removal of the steering force. Until pressure in one of the centering chambers exceeds the setting of valve 242, movement of both pistons is prevented by fluid trapped in the centering chambers by this valve and check valve 248 in a supply conduit 250. A solenoid operated dump valve 246, which may be actuated by switch 152, will release any residual centering chamber pressure through a drain line 247 in the event of a failure in the power steering system.

When the pressure setting of differential pressure valve 242 is reached, fluid then flows through conduit 244 and a conduit 252 into accumulator liquid chamber 64. Valve 242 is preferably of the spring biased type and dotted line 258 represents a pilot line through which centering chamber pressure is applied until it overcomes the force of a diaphragm spring 260 and opens the valve. The pressure setting of this valve can be varied by adjusting the spring tension, and the valve may include a remotely controlled solenoid 262 so that the pressure differential can be manually or automatically varied in accordance with vehicle speed.

The orifice 254 may be used to control the rate of fluid flow out of the respective centering chambers when valve 242 is open. Orifice 254 may be fixed or variable in size and in either case provides a flow resistance that varies in response to the rate of piston movement. If orifice 254 is of variable size, it may be operated by a remotely controlled solenoid 256 to make its flow restriction controllably variable in response to vehicle speed or to a manual selector. Orifice 254 may comprise a solenoid operated throttle valve or a multiported valve with different size outlet orifices. Both the orifice solenoid 256 and the valve solenoid 262 may be controlled automatically by the on-board computer 160 through the use of inputs and outputs similar to those already described for automatically controlling pressure regulator 69.

The pressurized hydraulic fluid available from the accumulator is transmitted to the centering chambers 46 and 48 through the inlet/outlet conduit segment 58A, the supply conduit 250, and the inlet/outlet conduit segment 58B. This accumulator energy provides the return force for reseating pistons 42 and 44 in their retracted positions upon removal of intentional steering inputs. Should the rate of piston return to center be too rapid and cause the steering system to overshoot its center position, an orifice 264 may also be installed in supply conduit 250 to control the rate of fluid flow into the respective centering chambers. However, such flow restrictions should not prevent a relatively free return of all components to center.

Although auxiliary fluid system 240 is optional, the differential pressure valve 242 is an important feature because it may provide improved centering stability and steering control. The steering force may vary within the range of resistance represented by valve 242 without generating any steering movement. This valve then opens at its set point and remains open as long as a pressure differential above the set point exists between pilot line 258 and conduit 252. It will therefore remain open while a centering piston is moving away from center and will close when such movement stops because continued flow through orifice 254 will lower the pressure differential below the set point.

Thereafter, when the steering force drops below the opposing return force generated by accumulator pressure through supply conduit 250, the off-center piston returns to its retracted position as fluid flows from the accumulator through check valve 248. Differential pressure valve 242 in combination with accumulator 62 therefore provides a static resistance force greater than the dynamic resistance force provided by the accumulator alone. The term "static" is used in this specification to distinguish the variable resistance force provided by orifice 254 in response to the rate of fluid flow produced by movement of a centering piston. By comparison, the resistances provided by accumulator 62 and valve 242 are both present without fluid flow.

The particularly important trimming feature of the invention may be achieved through accumulator systems other than the hydraulic accumulator unit 62. For example, other useful accumulator systems are described in my prior U.S. Pat. Nos. 4,418,931 and 4,534,577, and in my prior applications including International Application PCT/US02/11505 filed Apr. 15, 2002, and U.S. patent application Ser. No. 09/699,520 filed Oct. 31, 2000, the entire contents of these patents and applications being incorporated herein by reference. However, the accumulator system shown in the drawings is preferably for its precision and ability to provide a greater range of resistance and return forces.

The remote trimming features of the invention are useable not only with the centering unit disclosed herein, but also in combination with centering mechanisms of the prior art. Thus, the remotely operable trimming unit of the present invention can be combined with centering devices of known types to provide adjustment of the center position during vehicle operation. In addition, a number of other modifications to both the variable resistance components and the trimming components specifically described herein are possible without departing from the scope of the invention, as defined by the claims below.

What is claimed is:

1. An apparatus for holding at a center position at least one steerable member mounted on a frame means for movement to either side of the center position, said apparatus comprising linkage means of variable length extending between said steerable member and said frame means, the length of said linkage means defining said center position, and accumulator means for holding a supply of fluid and means for pressurizing the fluid held in said accumulator means;

wherein said linkage means comprises centering means for providing a resistance force resisting steering forces tending to move said steerable member to either side of the center position, and trim means for transmitting said steering forces to said centering means;

wherein said trim means comprises:
 a trim piston,
 trim cylinder means providing a portion of said linkage means and cooperating with said trim piston to form first and second trim chambers one on each side of said trim piston,
 and trim fluid means for providing a flow of trim fluid between said accumulator means and each of said trim chambers and comprising trim valve means operable between a closed position for preventing said trim fluid flow so that said trim piston is held in a locked position, and an open position for allowing said trim fluid flow so that said trim piston is free to move away from said locked position in said trim cylinder, said trim piston movement causing trim fluid flow to one of said trim chambers and trim fluid flow from the other of said trim chambers to permit trimming movement of said steerable member to another center position by changing the length of said linkage means in response to said steering forces;

wherein said centering means comprises:
 centering cylinder means providing a portion of said linkage means,
 centering piston means cooperating with said centering cylinder means to form first and second centering chambers, and being arranged for movement in a first direction for compressing a fluid within said first centering chamber and for movement in a second direction for compressing a fluid within said second centering chamber,
 centering rod means providing a portion of said linkage means and arranged for movement with said centering piston means to either side of a neutral position corresponding to said center position,
 and centering fluid means for providing a pressurized centering fluid in each of said first and second centering chambers so that fluid pressure provides said resistance force by biasing said centering piston means toward said neutral position upon movement of said steerable member toward either side of said center position;

wherein said trim cylinder means and said centering cylinder means are interconnected by an intermediate head member and said trim valve means is located in said intermediate head member;

and wherein said trim fluid means further comprises:
 conduit means for providing fluid communication between said accumulator means and said centering chambers,
 a first supply passage in said intermediate head member for communicating with at least one of said centering chambers to supply trim fluid to said first trim chamber,
 a second supply passage in said intermediate head member for communicating with at least one of said centering chambers to supply trim fluid to said second trim chamber,
 a first return passage in said intermediate head member for communicating with one of said trim chambers to return trim fluid to said conduit means,
 a second return passage in said intermediate head member for communicating with the other of said trim chambers to return trim fluid to said conduit means,
 a first supply valve for preventing reverse fluid flow in said first supply passage,
 a second supply valve for preventing reverse fluid flow in said second supply passage,
 a first return valve for preventing reverse fluid flow in said first return passage,
 and a second return valve for preventing reverse fluid flow in said second return passage;

and wherein said apparatus further comprises operating means activatable from a remote location for operating said trim valve means between said closed and open positions.

2. An apparatus according to claim 1 wherein said trim valve means comprises a valve member arranged for reciprocating movement between a closing position for causing simultaneously closure of said first and second return passages and an opening position for causing simultaneously opening of said first and second return passages.

3. An apparatus according to claim 2 wherein said trim valve means is carried by said intermediate head member internally within said centering cylinder means or said trim cylinder means.

4. An apparatus according to claim 3 wherein said trim valve means is carried by said intermediate head member internally within said centering cylinder means and comprises an actuator at least partially projecting into an adjacent one of said centering chambers, and wherein said centering piston means comprises a piston member arranged to reciprocate in said adjacent centering chamber, said piston member having a recess for receiving a projecting part of said actuator during at least a portion of said reciprocation.

5. An apparatus according to claim 1 wherein said fluid is a liquid and said accumulator means comprises a reservoir for holding a supply of said liquid and a gas chamber in fluid communication with said reservoir, and wherein said apparatus further comprises means for pressurizing said gas chamber with a gas to pressurize the liquid in said reservoir, and means for controllably varying the pressure of said gas so as to vary said liquid pressurization.

6. An apparatus according to claim 1 wherein said pressurizing means includes means for controllably varying said fluid pressure so as to vary at least one of said resistance force and said return force.

7. An apparatus according to claim 1 wherein the fluid supplied by said accumulator means is a liquid and said liquid flows to and from said centering chambers via said conduit means, and wherein said conduit means comprises a pressure actuated valve means for preventing fluid flow from said centering chambers until an engagement between said centering rod means and said centering piston means produces a fluid pressure differential above an accumulator pressure by a selected amount.

8. An apparatus according to claim 7 wherein said pressure actuated valve means includes mean for controllably varying said selected amount of fluid pressure differential.

9. An apparatus according to claim 1 for a vehicle having a steering system comprising said at least one steerable member, wherein the fluid supplied by said accumulator means is a liquid and said liquid flows to and from said centering chambers via said conduit means; and wherein said pressurizing means comprises gas pressure means for applying pressure of a pressurized gas to said liquid in a liquid reservoir, and control means for automatically adjusting the amount of said gas pressure in response to the speed of said vehicle.

10. An apparatus according to claim 1 for a vehicle having a power steering unit for providing steering power to said steerable member, said apparatus further comprising means for preventing fluid pressure in said accumulator means in the absence of steering power from said power steering unit.

11. An apparatus according to claim 1 wherein said centering piston means comprises a first piston cooperating with said centering cylinder means to define said first centering chamber, and a second piston cooperating with said centering cylinder means to define said second centering chamber, each of said first and second pistons being arranged to move independently of the other between a retracted position and a position for compressing a fluid within its corresponding chamber;

wherein said centering rod means comprises a rod head arranged for movement to either side of a neutral position corresponding to said center position, and an elongated rod for causing said rod head to engage each of said centering pistons independently of the other so that movement of said rod head away from said neutral position to one side causes compressive movement of said first centering piston without moving said second centering piston and movement of said rod head away from said neutral position to the other side causes compressive movement of said second centering piston without moving said first centering piston; and, wherein said apparatus further comprises connecting means for connecting said elongated rod or said centering cylinder means to said steerable member for movement therewith.

12. An apparatus according to claim 11 wherein said fluid is a liquid and said accumulator means comprises a reservoir for holding a supply of said liquid, a gas chamber for pressurizing the liquid held in said reservoir and an outlet for providing fluid communication between said liquid reservoir and said conduit means; and, wherein said pressurizing means includes gas means for pressurizing said gas chamber with a gas to pressurize the liquid in said reservoir, said gas means comprising control means for selectively varying the pressurization of said gas chamber so as to controllably vary said liquid pressurization.

13. An apparatus according to claim 12 for a vehicle having a steering system comprising said at least one steerable member, wherein said control means includes means for automatically varying said gas chamber pressurization in response to the speed of said vehicle.

14. An apparatus according to claim 1, wherein said trim valve means is carried by said intermediate head member internally within said centering cylinder means or said trim cylinder means; and wherein said operating means comprises a solenoid carried by said intermediate head member and arranged to open and close said trim valve means, a remote actuator for activating said solenoid, and electrical connecting means connecting said solenoid to said actuator.

15. An apparatus according to claim 14, wherein said electrical connecting means comprises an axial conducting member electrically connected to said solenoid, a transverse conducting member electrically connected to said remote actuator, and a conducting spring member resiliently connecting said axial and transverse members.

* * * * *